(12) United States Patent
Dinan et al.

(10) Patent No.: US 6,696,226 B1
(45) Date of Patent: Feb. 24, 2004

(54) SIMULTANEOUS DEFINITION AND DIRECT TRANSFER OF A WRITE HEAD POLE AND COIL FOR A MAGNETIC READ/WRITE HEAD

(75) Inventors: Thomas Edward Dinan, San Jose, CA (US); Jeffrey S. Lille, Sunnyvale, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/290,747

(22) Filed: Nov. 8, 2002

(51) Int. Cl.⁷ ................................................ G11B 5/147
(52) U.S. Cl. ...................... 430/320; 430/314; 430/319; 29/603.07; 29/603.25
(58) Field of Search ................................ 430/314, 319, 430/320; 360/126; 29/603.07, 603.25

(56) References Cited

U.S. PATENT DOCUMENTS

| | | | |
|---|---|---|---|
| 5,414,580 A | 5/1995 | Levenson et al. | 360/123 |
| 5,512,394 A | 4/1996 | Levenson et al. | 430/5 |
| 5,621,596 A | 4/1997 | Santini | 360/126 |
| 5,793,578 A | 8/1998 | Heim et al. | 360/126 |
| 5,798,897 A | 8/1998 | Chang et al. | 360/126 |
| 5,805,391 A | 9/1998 | Chang et al. | 360/113 |
| 5,935,644 A | 8/1999 | Heim et al. | 427/116 |
| 6,111,724 A | 8/2000 | Santini | 360/126 |
| 6,226,149 B1 * | 5/2001 | Dill, Jr. et al. | 360/126 |
| 2002/0191336 A1 * | 12/2002 | Hsiao et al. | 360/126 |

* cited by examiner

*Primary Examiner*—John A. McPherson
(74) *Attorney, Agent, or Firm*—Silicon Valley IP Group, PC; Dominic M. Kotab

(57) ABSTRACT

A method of making a magnetic read/write head using a single lithographic step to define both a write coil and a pole tip structure. The use of a thin image resist layer over a hard reactive-ion etch mask and image transfer techniques allows very high resolution optical lithography which can accommodate formation of a very compact coil and pole structure. The use of a single high resolution lithography step on a planarized structure to define both a write pole tip and a write coil coplanar with the write pole tip avoids the problems of reflective notching associated with lithography to define the pole tip in the vicinity of non-planar features of the coil structure and also eliminates alignment inaccuracies inherent in separate lithography processes for the coil and pole.

23 Claims, 14 Drawing Sheets

SIMULTANEOUS DEFINITION AND DIRECT TRANSFER OF A WRITE HEAD POLE AND COIL FOR A MAGNETIC READ/WRITE HEAD

BACKGROUND OF THE INVENTION

1. Field of the Invention

This invention relates to magnetic transducers particularly applicable to magnetic disk drive systems. More particularly, the invention relates to thin film inductive read/write heads for ultra high density recording using a single lithographic step to define both a write coil and a pole structure.

2. Description of the Related Art

Thin film magnetic read/write heads are used for reading and writing magnetically coded data stored on a magnetic storage medium such as a magnetic disk or a magnetic tape. There is a continuing strongly-felt need for increasing the data storage density in such media. Most efforts to increase magnetic storage density involve techniques for increasing the areal bit density in the magnetic medium.

In rotating magnetic disk drives, the areal density is the product of the number of flux reversals per millimeter along a data track and the number of tracks available per millimeter of disk radius. Thus, high areal data storage density requires recording heads with high linear resolution and narrow track width.

A thin film inductive write head includes one or more coil layers imbedded in an insulation stack, the insulation stack being sandwiched between first and second pole piece layers. A write gap is formed in a pole tip region by provision of a gap layer between the pole pieces. The pole pieces are magnetically coupled in a back region. Between the pole tip region and the back gap region is a yoke region where the pole piece layers separate from one another to accommodate the insulation stack. The insulation stack typically includes a first insulation layer (I1) on the first pole piece layer, one or more coil layers on the first insulation layer, an additional insulation layer (I2) over the coil layer.

A combined head, such as a merged magnetoresistive (MR) head, includes the aforementioned write head as a write head portion combined with an MR read head portion. The MR read head portion includes an MR sensor which is sandwiched between first and second gap layers which are in turn sandwiched between first and second shield layers. In a merged MR head, a single layer serves a double function as a second shield layer for the read head and as a first pole piece for the write head. The combined head is carried on a slider which, in turn, is mounted on a suspension in a magnetic disk drive. The suspension is mounted on an actuator which moves the combined head over selected tracks on a rotating disk for reading and writing signals thereon. As the disk rotates a cushion of air is developed to provide an air bearing between the disk and the slider which counterbalances a loading force exerted by the suspension. A surface of the slider facing the disk is called an air bearing surface (ABS) and is typically spaced from the disk on the order of 0.02 μm when the disk is rotating.

Future high data rate, high efficiency, inductive thin film write heads will need sub-micron resolution for both the coils and the poles. It is a well-known problem in the art of photolithography for head fabrication that as resist dimensions become smaller so do the specifications for resist coating uniformity, thickness depth of focus limitations and planarization repeatability, all of which are needed to avoid reflective artifacts and to obtain repeatability across the wafer. As yoke lengths in magnetic read/write heads shrink to dimensions less than 10 μm, increasingly narrower pitch write coils must be fabricated where the line width of the resist image may be less than 0.5 μm. The fabrication of the ferromagnetic write poles is also demanding on the same properties of the resist as well as tooling.

Accordingly, there is a strong felt need to improve the fabrication process to better define the poles as well as the coils in an ultra high density structure to meet the requirements of future high density magnetic recording heads.

SUMMARY OF THE INVENTION

It is an object of the present invention to disclose a ethod for making an inductive write head using a single lithographic step to define both a pole tip structure and a write coil that is coplanar with the pole tip structure.

It is another object of the present invention to disclose a method for making an inductive write head using a thin resist lithographic step and an image transfer technique for patterning the coplanar coils and pole tips.

It is yet another object of the present invention to disclose a method of making an inductive write head wherein the separation between the back end of a pole tip and the outermost turn of an inductive write coil is less than the final pole tip height.

It is a further object of the present invention to disclose a method of making an inductive write head wherein a first pole tip pedestal and a first inductive write coil layer coplanar with the first pole tip pedestal are defined in a first single lithographic step and wherein a second pole tip and a second inductive write coil layer coplanar with the second pole tip are defined in a second single lithographic step.

In accordance with the principles of the present invention, there is disclosed a method of making a read/write head having an inductive write head element whereby a second pole tip and an inductive write coil layer coplanar with the second pole tip are defined in a single thin resist lithographic step and image transfer process. The write head is formed over a magnetoresistive read head comprising a magnetoresistive sensor sandwiched between nonmagnetic insulative first and second gap layers which in turn are sandwiched between ferromagnetic first and second shield layers. An insulation layer is deposited over the second shield layer and a first write pole piece (P1) layer is defined and plated over the insulation layer. A photolithography step defines a first pole tip pedestal (P1P) at the ABS and the bottom element of a back gap element at the end of the first pole piece layer removed from the ABS. The P1P and back gap element are plated on P1 and a layer of inset insulation is deposited followed by a first planarization step, preferably a chemical-mechanical polish (CMP) process, to planarize the layer. After the planarization step, a write gap layer is deposited after which the gap material in the area of the back gap is etched out. A conductive seed layer is deposited over the P1P and the inset insulation. A hard-baked photoresist layer having a thickness greater than the desired thickness of the second pole tip (P2) or the write coil layer is deposited over the write gap/seed layer and the end of P1 removed from the ABS. A hard reactive-ion etchable (RIE) mask layer of RIE-able material such as $TaO_x$, or alternatively Ta, Si or $SiO_2$, is deposited on the hard baked photoresist layer and a thin image resist layer is formed on the hard RIE mask. Conventional high resolution lithography defines both P2 and the write coil structure coplanar with P2 in a single lithography step over the hard RIE mask. The image of the thin image resist is transferred via a fluorine containing plasma etch process into the underlying hard mask of, for example, $TaO_x$.

Using an $O_2$ plasma through the opening in the hard mask, a RIE of the hard-baked photoresist is done exposing the seed layer under the P2 and write coil areas. Resist is deposited to protect the coil part of the opened structure and the P2 tip and the part of P2 forming the upper layer of the back gap are deposited, preferably by plating, with a ferromagnetic material such as Ni—Fe. The coil protection resist is removed and resist is deposited to protect the P2 tip and the back gap followed by deposition, preferably by plating, of the write coil with a conductive material such as copper (Cu). The coil protection resist is removed by development followed by removal of the hard-baked resist and the seed layer using suitable RIE processes. A planarizing layer of alumina is deposited over the entire structure followed by a second planarization step, preferably a CMP process, to planarize the structure at the desired thickness level of P2 and the write coil. A hard-baked resist layer is formed over the coil area to fill any voids in the planarizing alumina and to form an insulation layer between the coils and the subsequently formed pole (P3) structure connecting the P2 tip and the P2 back gap layer.

In another embodiment of the invention, there is disclosed a method of making a read/write head having a write coil that is plated before plating the pole piece. In this embodiment, the write coil is first plated with a conductive material such as copper (Cu). After the coil is plated and protected, the pole piece and back gap are plated with a ferromagnetic material such as NiFe.

In another embodiment of the invention, there is disclosed a method of making a read/write head having an inductive write head element with two write coils layers whereby a first pole tip pedestal (P1P) and an inductive first write coil layer that is coplanar with the P1P are defined in a single thin resist lithographic step and image transfer process over the P1 layer. A second pole tip (P2) and an inductive second write coil layer that is coplanar with the P2 are defined in a subsequent single thin resist lithographic step and image transfer process over a write gap layer deposited over the P1P and the first write coil.

In yet another embodiment of the invention, there is disclosed a method of making a read/write head having an inductive write head element with two write coils layers whereby a first pole tip pedestal (P1P) and an inductive first write coil layer coplanar with the P1P are defined in a single thin resist lithographic step and image transfer process over the P1 layer. A second pole tip (P2) and an insulation layer coplanar with the P2 are formed over the P1P and first write coil layer and a second write coil layer is formed over the insulation layer by processes known to the art.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
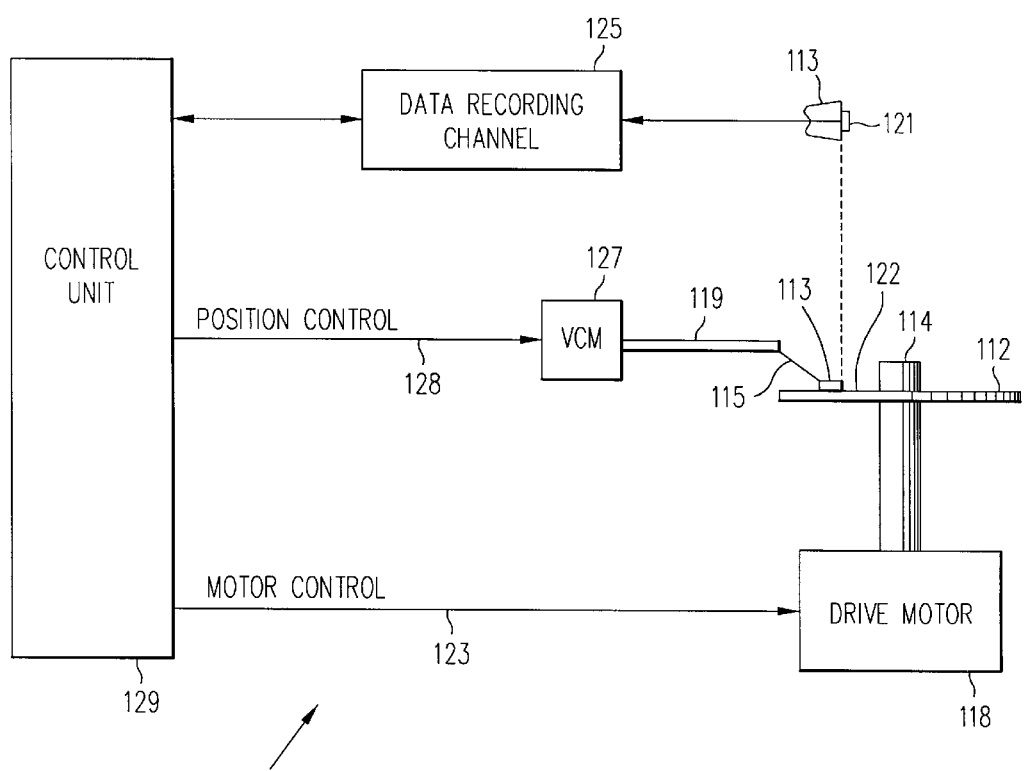
FIG. 1 is a simplified diagram of a magnetic recording disk drive system using an inductive write head made by the method of the present invention.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on the disk 112.

At least one slider 113 is positioned on the disk 112, each slider 113 supporting one or more magnetic read/write heads 121 where the head 121 incorporates the magnetic read/write head of the present invention. As the disks rotate, the slider 113 is moved radially in and out over the disk surface 122 so that the heads 121 may access different portions of the disk where desired data is recorded. Each slider 113 is attached to an actuator arm 119 by means of a suspension 115. The suspension 115 provides a slight spring force which biases the slider 113 against the disk surface 122. Each actuator arm 119 is attached to an actuator 127. The actuator as shown in FIG. 1 may be a voice coil motor (VCM). The VCM comprises a coil movable within a fixed magnetic field, the direction and speed of the coil movements being controlled by the motor current signals supplied by a controller 129.

During operation of the disk storage system, the rotation of the disk 112 generates an air bearing between the slider 113 (the surface of the slider 113 which includes the head 121 and faces the surface of the disk 112 is referred to as an air bearing surface (ABS)) and the disk surface 122 which exerts an upward force or lift on the slider. The air bearing thus counterbalances the slight spring force of the suspension 115 and supports the slider 113 off and slightly above the disk surface by a small, substantially constant spacing during normal operation.

The various components of the disk storage system are controlled in operation by control signals generated by the control unit 129, such as access control signals and internal clock signals. Typically, the control unit 129 comprises logic control circuits, storage chips and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the disk 112. Read and write signals are communicated to and from the read/write heads 121 by means of the recording channel 125. Recording channel 125 may be a partial response maximum likelihood (PRML) channel or a peak detect channel. The design and implementation of both channels are well known in the art and to persons skilled in the art. In the preferred embodiment, recording channel 125 is a PRML channel.

The above description of a typical magnetic disk storage system, and the accompanying illustration of FIG. 1 are for representation purposes only. It should be apparent that disk storage systems may contain a large number of disks and actuator arms, and each actuator arm may support a number of sliders.

Figure 2:
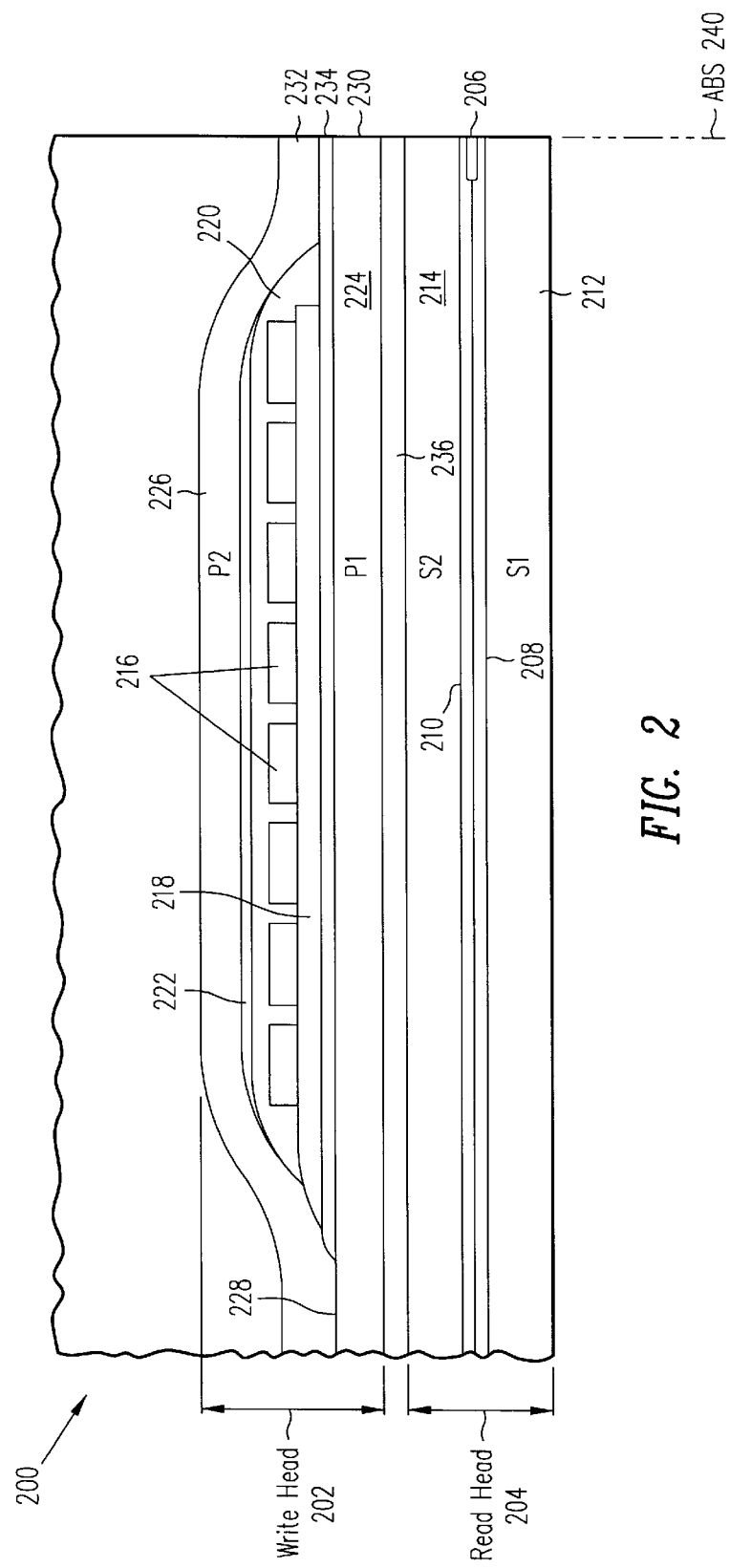
FIG. 2 is a vertical cross-section, not to scale, of a "piggyback" read/write magnetic head.

FIG. 2 is a side cross-sectional elevation view of a "piggyback" magnetic read/write head 200, which includes a write head portion 202 and a read head portion 204, the read head portion employing a magnetoresistive (MR) sensor 206. The MR sensor 206 is sandwiched between nonmagnetic insulative first and second read gap layers 208 and 210, and the read gap layers are sandwiched between ferromagnetic first and second shield layers 212 and 214. In response to external magnetic fields, the resistance of the MR sensor 206 changes. A sense current $I_S$ conducted through the sensor causes these resistance changes to be manifested as potential changes. These potential changes are then processed as readback signals by the processing circuitry of the data recording channel 146 shown in FIG. 1.

The write head portion 202 of the magnetic read/write head 200 includes a coil layer 216 sandwiched between first and second insulation layers 218 and 220. A third insulation layer 222 may be employed for planarizing the head to eliminate ripples in the second insulation layer 220 caused by the coil layer 216. The first, second and third insulation layers are referred to in the art as an insulation stack. The coil layer 216 and the first, second and third insulation layers 218, 220 and 222 are sandwiched between first and second pole piece layers 224 and 226. The first and second pole piece layers 224 and 226 are magnetically coupled at a back gap 228 and have first and second pole tips 230 and 232 which are separated by a write gap layer 234 at the ABS 240. An insulation layer 236 is located between the second shield layer 214 and the first pole piece layer 224. Since the second shield layer 214 and the first pole piece layer 224 are separate layers this read/write head is known as a "piggyback" head.

Figure 3:
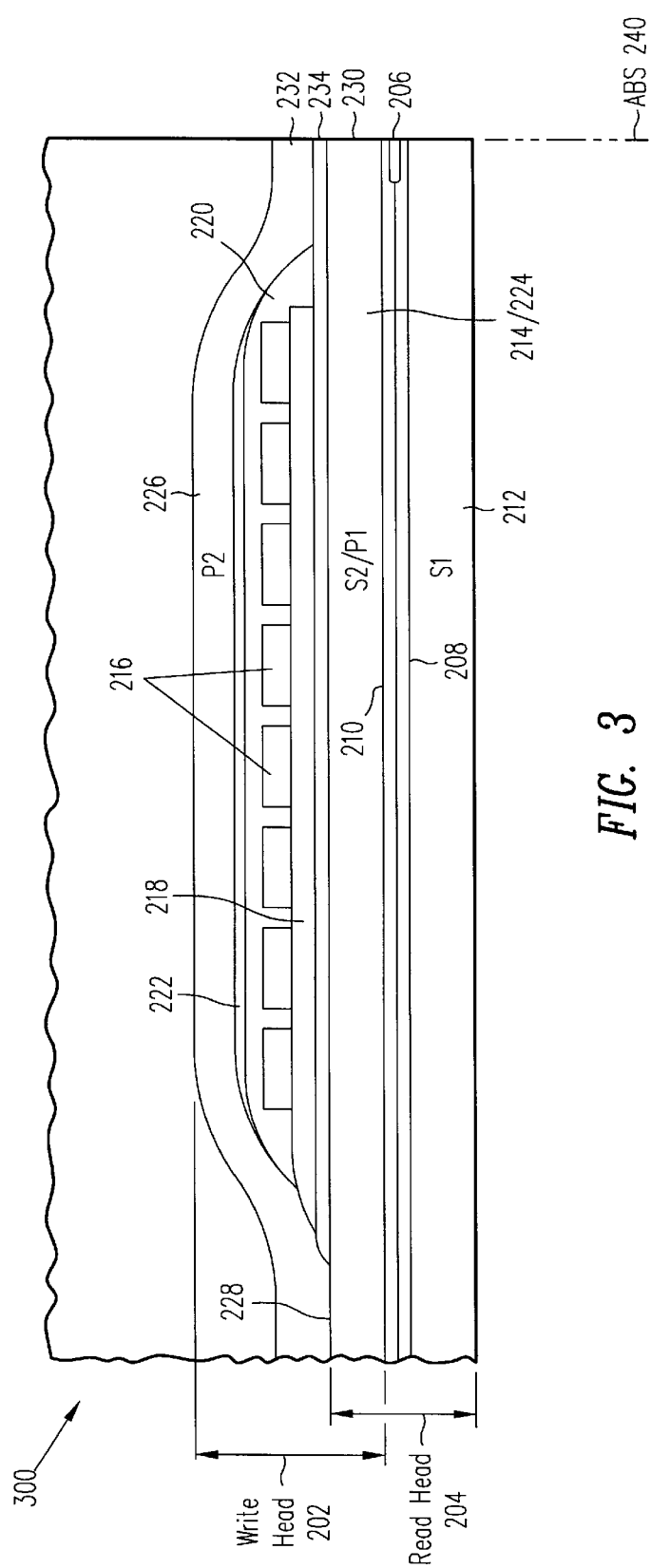
FIG. 3 is a vertical cross-section, not to scale, of a "merged" read/write magnetic head.

FIG. 3 is the same as FIG. 2 except the second shield layer 214 and the first pole piece layer 224 are a common layer. This type of read/write head is known as a "merged" head 300. The insulation layer 236 of the piggyback head in FIG. 2 is omitted in the merged head 300 of FIG. 3.

Figure 4:
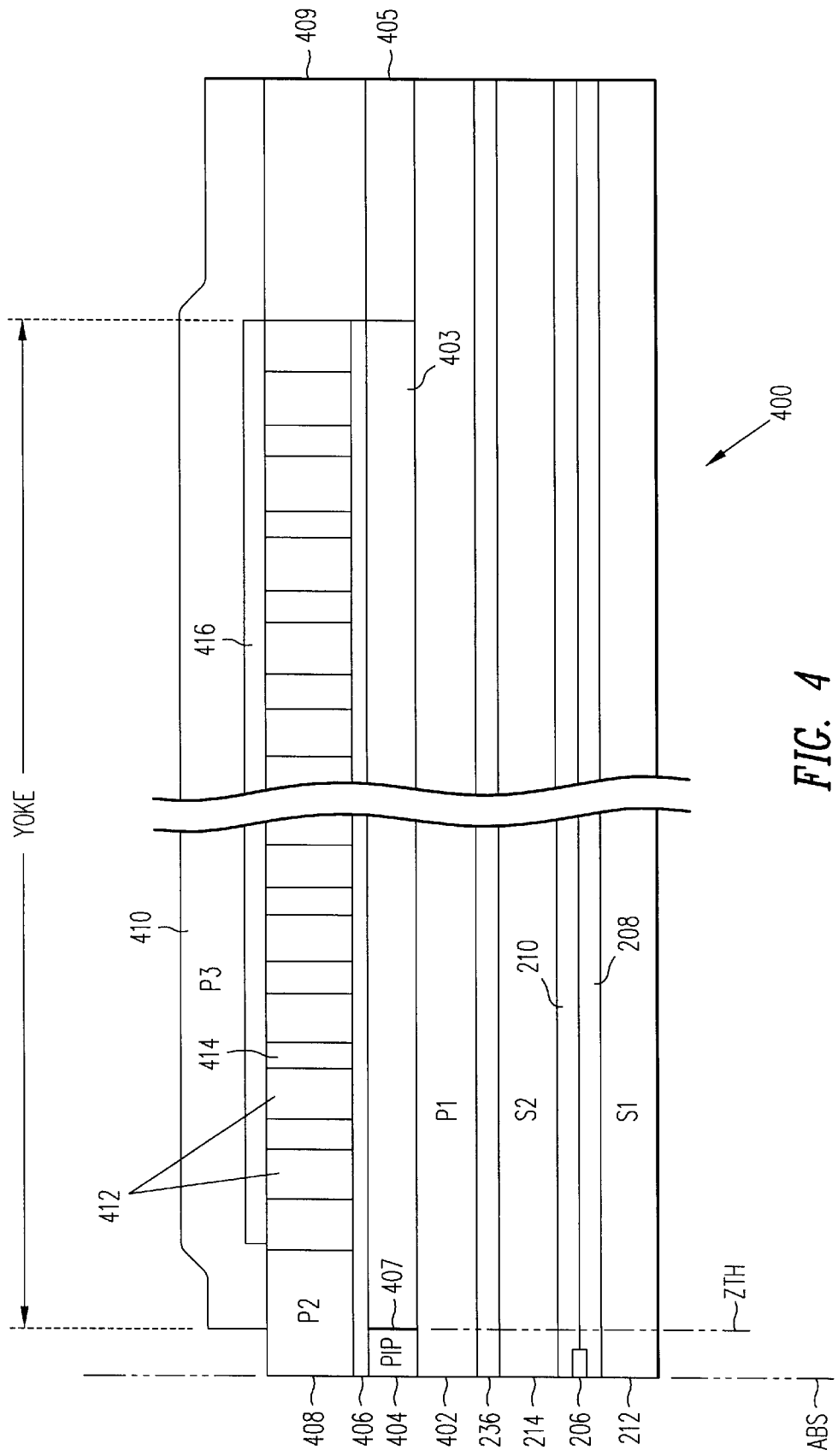
FIG. 4 is a vertical cross-section, not to scale, of a read/write head made by the method of the present invention.
Figure 5:
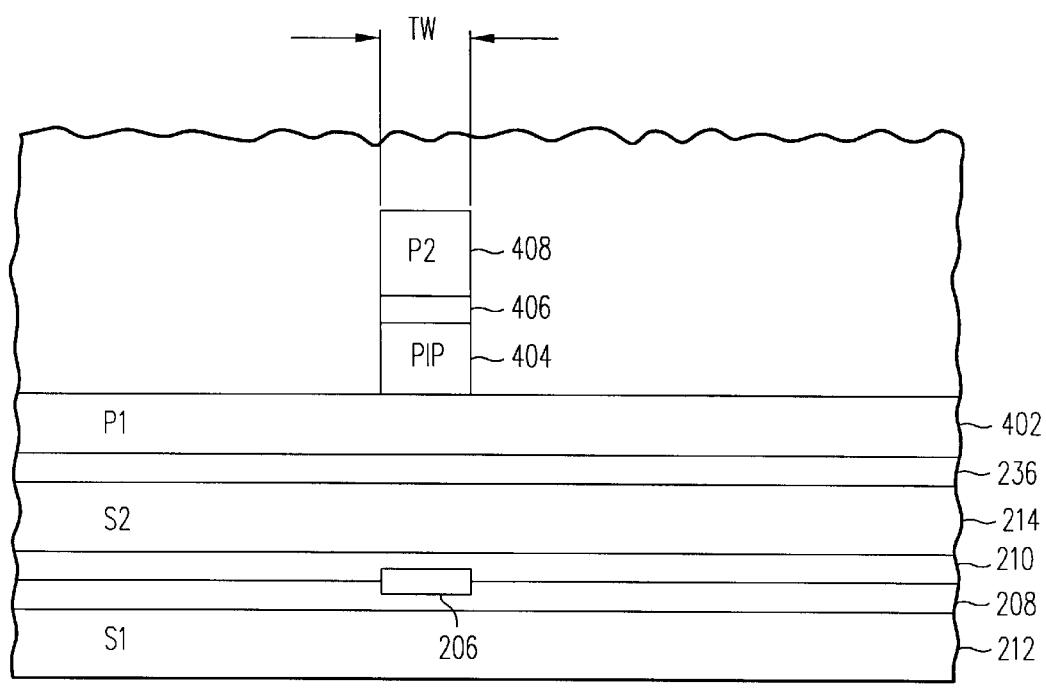
FIG. 5 is an ABS view, not to scale, of the read/write head of FIG. 4.
Figure 6:
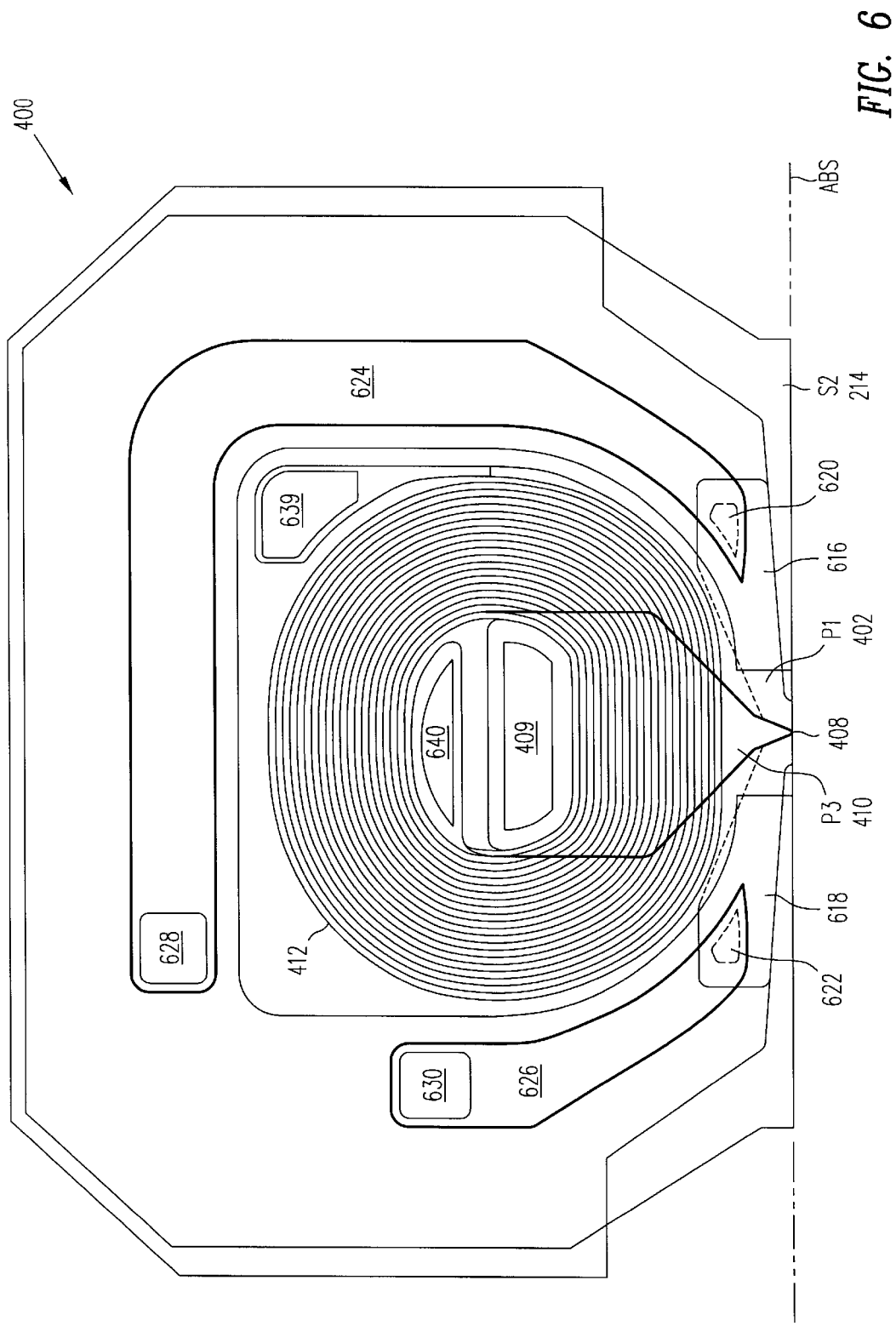
FIG. 6 is a plan view of the read/write head of FIG. 4.

A read/write head 400 made by an embodiment of the method of the present invention is shown in FIGS. 4, 5 and 6. FIG. 4 is a vertical cross-section view, not to scale, FIG. 5 is an ABS view, not to scale and FIG. 6 is a plan view of an exemplary "piggyback" head. Referring now to FIGS. 4, 5 and 6, the write head element of the head is formed over the insulation layer 236 deposited on the second shield layer 214 of the read head element. The first write pole piece (P1) layer 402 is plated over the insulation layer 236. A first pole tip pedestal (P1P) 404 is formed on P1 at the ABS and the bottom back gap (BG) element 405 is formed on P1 at the end removed from the ABS. The edge of the P1P 407 furthest from the ABS defines the zero throat height (ZTH) for this head design. The inset insulation layer 403 is formed on P1 in the region between the P1P 404 and the BG 405. After a CMP planarization step, the write gap layer 406 is deposited over the P1P and inset insulation layer. The second pole tip (P2) 408 is formed on the write gap layer at the ABS and the upper element of the BG element 409 is formed on the lower BG element. The yoke extends from the edge of the inset yoke closest to the ABS to the edge of the BG element nearest to the ABS. In this head design, the track width (TW) is defined by the width of P2 408. The coil layer 412 is formed over the write gap layer in the region between P2 408 and the BG element 409. The coil layer 412 is coplanar with the the P2 408. The coil insulation layer 414 is formed between the coils 412 and after a second CMP planarization, a hard-baked resist layer 416 is formed over the coil layer 412 and the coil insulation layer 414. A pole (P3) structure 410 connecting the P2 tip 408 and the BG layer 409. The P2 tip 408 has a portion which lies under the P3 410 to stitch the two layers. The P3 structure is recessed away from the ABS. First and second leads 616 and 618 connect the MR sensor 206 to the recording channel 125 as shown in FIG. 1. The first and second leads are connected to first and second conductors 624 and 626, respectively, at conductive vias 620 and 622. The conductors are in turn connected by conductive vias 628 and 630 to leads (not shown) which extend to the recording channel 125. The write coil 412 is connected to write coil pads 639 and 640 which are connected to leads (not shown) which extend to the recording channel 125.

Figure 7A:
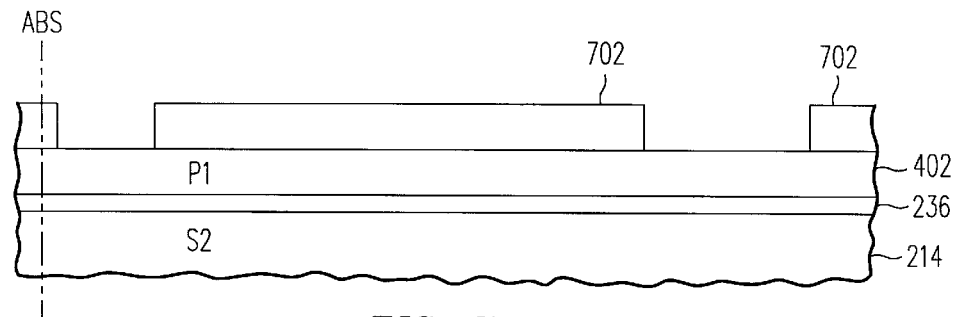
FIGS. 7a–7l are vertical cross-sections, not to scale, of the read/write head of FIG. 4 illustrating sequential steps of making the head by the method of the present invention.
Figure 7B:
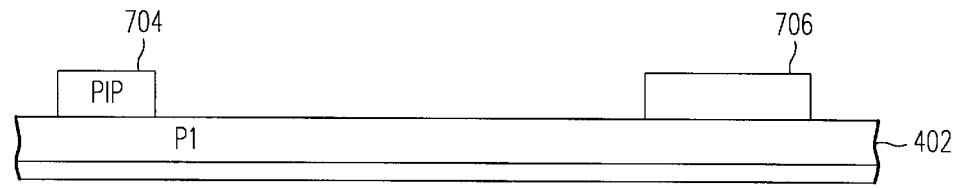
Figure 7C:
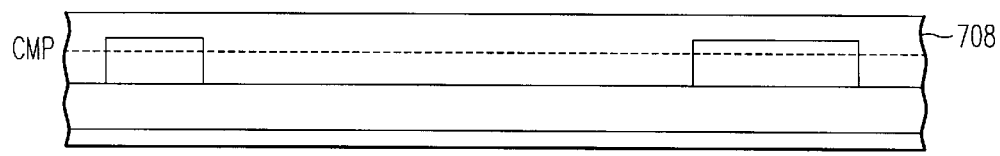
Figure 7D:
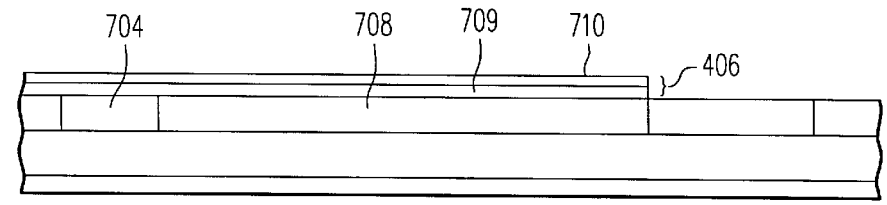
Figure 7E:
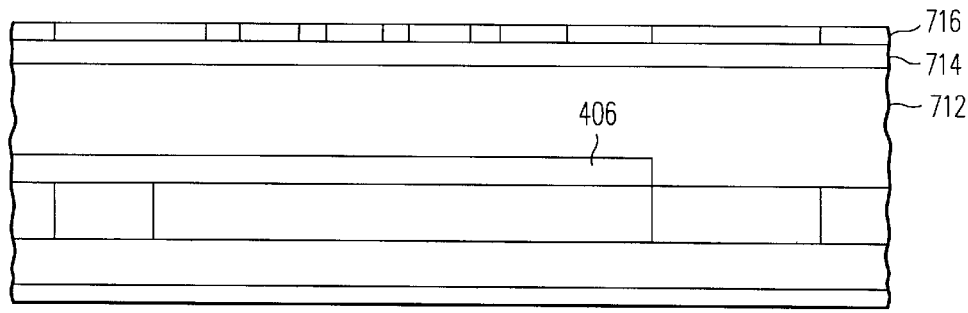
Figure 7F:
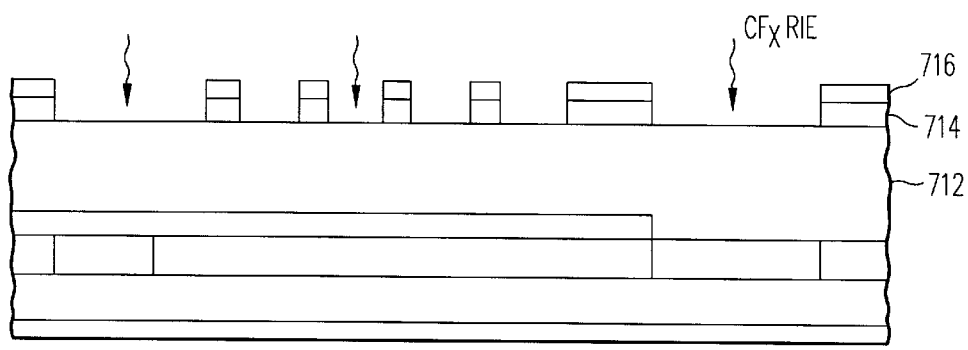

FIGS. 7a–7l illustrate the steps in a first embodiment of the present invention for the method of making a read/write head 400 as shown in FIGS. 4, 5 and 6 wherein a write head pole and a write coil, coplanar with the write pole, are defined in a single thin resist lithographic step and image transfer process. In the first embodiment, the write head second pole (P2) tip and the write coil of a single coil plane write head are defined in the single thin resist lithographic step and image transfer process of the invention. The write head is formed over a magnetoresistive read head comprising a magnetoresistive sensor sandwiched between nonmagnetic insulative first and second gap layers which in turn are sandwiched between ferromagnetic first and second shield layers. The ABS indicated in FIG. 7a is defined by lapping the read/write head 400 after the head fabrication process is completed. FIG. 7a shows an insulation layer 236 deposited over the second shield layer (S2) 214. A first write pole piece (P1) layer 402 is defined and formed by Ni—Fe plating over the insulation layer 236. A photolithography step in a resist 702 defines a first pole tip pedestal (P1P) at the ABS and the bottom element of a back gap element at the end of the first pole piece layer removed from the ABS. In FIG. 7b, the P1P 704 and back gap (BG) element 706 are formed by Ni—Fe plating on P1 702 and the resist 702 has been removed. In FIG. 7c, a layer of inset insulation 708 is deposited over the field followed by a first planarization step, preferably a chemical-mechanical polish process, to planarize the structure. In FIG. 7d, a write gap layer 406 is deposited over the P1P and the inset insulation. The write gap is chosen to have the combined function of write gap and seed layer for the write coil and P2. The write gap 406 may comprise a first sublayer 709 formed of tantalum (Ta) having a thickness in the range of 100 Å to promote adhesion and a second sublayer 710 formed of a nonmagnetic material such as nickel phosphide (NiP), ruthenium (Ru), rhodium (Rh), or platinum (Pt) having a thickness in the range of 400–1600 Å deposited over the first sublayer. Alternatively, the write gap 406 may be formed predominately of a single layer of nonmagnetic readily RIE-able material such as tungsten (W) or molybdenum (Mb). In FIG. 7e, a hard-baked photoresist layer 712 having a thickness greater than the desired thickness of the second pole tip (P2) or the write coil layer is deposited over the write gap 406. A hard reactive-ion etch (RIE) mask layer 714 of RIE-able material such as $TaO_x$, or alternatively Ta, Si or $SiO_2$, having a thickness in the range of 0.2–0.4 $\mu$m is deposited on the hard baked photoresist layer 712 and a thin image resist layer 716 having a thickness of in the range of 0.3–0.6 $\mu$m is formed on the hard RIE mask 714. Both P2 and the write coil structure (for simplicity, only a small number (4) of coil turns of the write coil layer are shown in the drawings) as well as the BG structure are defined in the thin image resist layer 716 in a single high resolution lithography step over the hard RIE mask 714. Because the lithography is in a layer only 0.3–0.6 $\mu$m thick, the resolution limits of optical lithography can be extended to accommodate the advanced head structure. In FIG. 7f, the image of the thin image resist 716 is transferred via a $CF_x$ containing plasma RIE process into the underlying hard RIE mask 714 of $TaO_x$.

Figure 7G:
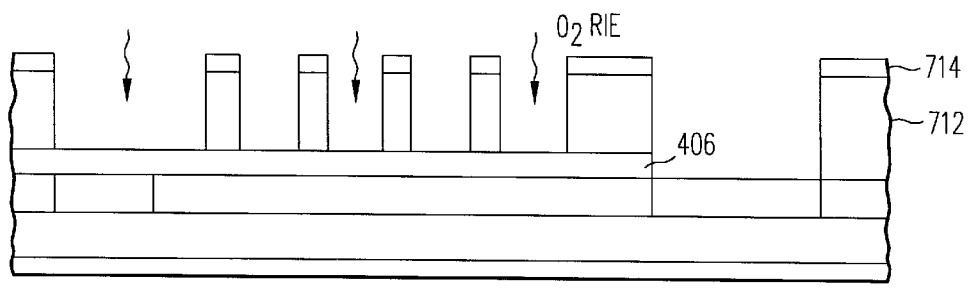
Figure 7H:
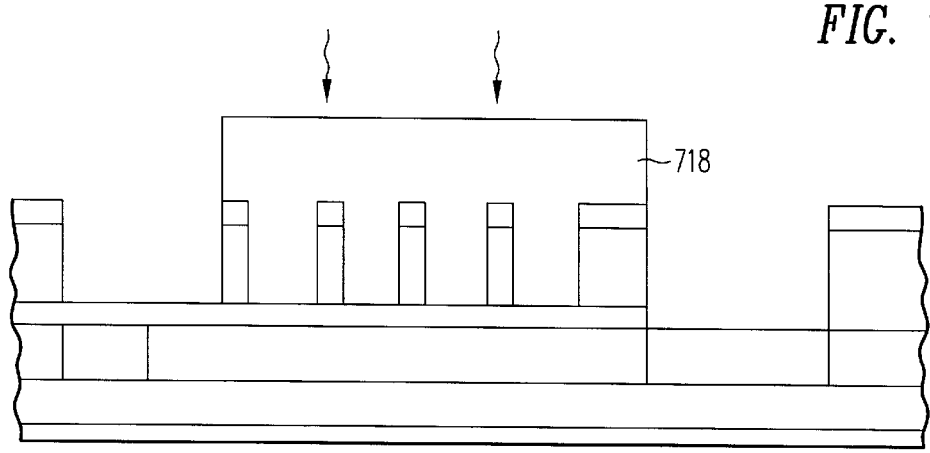
Figure 7I:
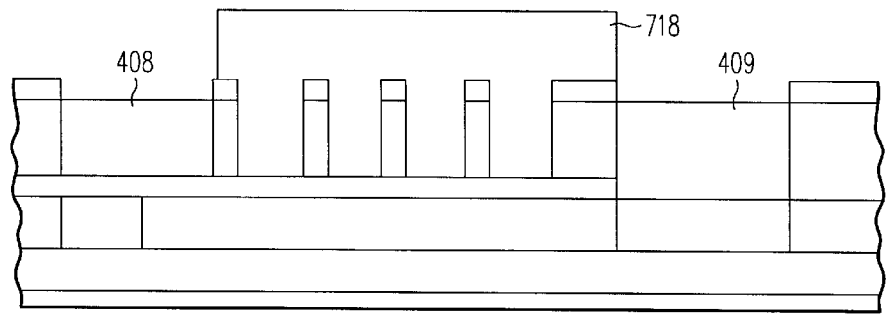
Figure 7J:
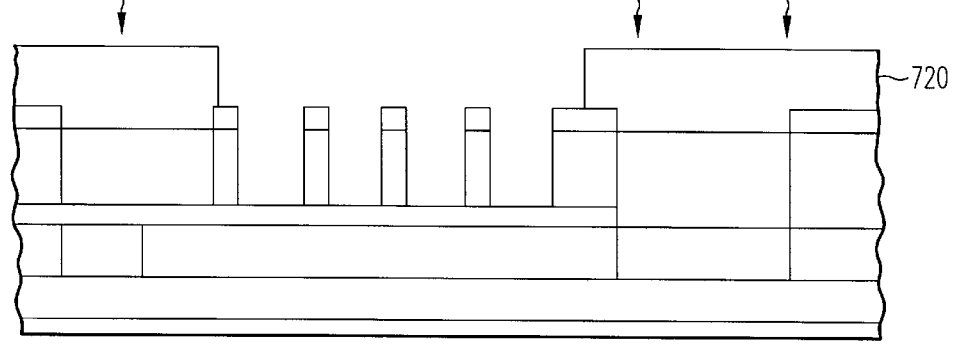
Figure 7K:
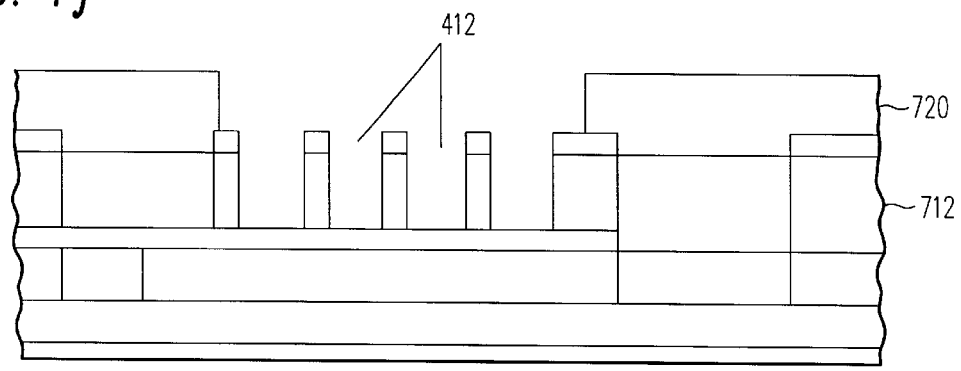
Figure 7L:
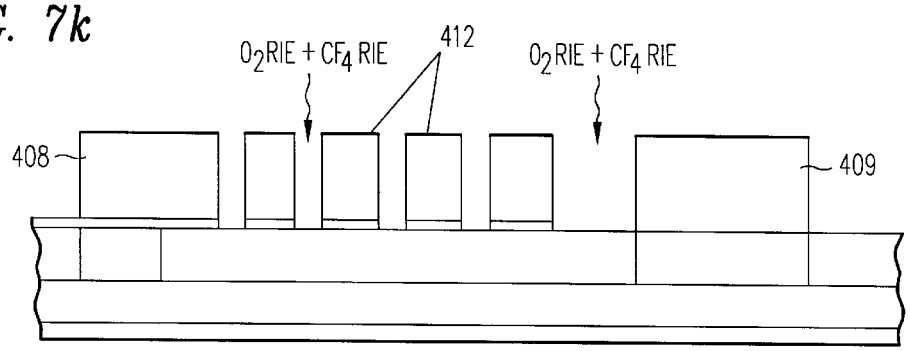

In FIG. 7g, using an oxygen-containing plasma through the openings in the hard RIE mask 714, a RIE of the hard-baked photoresist 712 is done exposing the write gap 406 under the P2 and write coil areas. In FIG. 7h, a resist 718 is formed over the coil area of the opened structure and is flood exposed. In FIG. 7i, the P2 tip 408 and the upper layer of the BG 409 formed of a magnetic material (e.g. Ni—Fe) are deposited, preferably by plating. In FIG. 7j, the coil protection resist 718 is removed by development and resist 720 is formed to cover P2 408, the BG 409 and the field and is flood exposed. In FIG. 7k, the write coil 412 formed of a conductive material (e.g. Cu) is deposited, preferably by plating.

Alternatively, the steps of forming the pole piece and the write coil may be reversed with the write coil layer being plated before plating the pole piece. In addition, the coverage of the pole protection resist 720 over the P2 tip 408 and the BG 409 is optional. If this protection layer is omitted, then copper is plated in the write coil location and also over the pole pieces. This excess copper material over the pole pieces is removed by a planarization step later in the process. Conversely, if the write coil 412 is deposited before the pole pieces 408 and 409, then the coil protection resist 718 is optional.

In FIG. 7I, the pole protection resist 720 is removed by development followed by removal by oxygen-containing RIE of the hard-baked resist 712 that defined P2, the BG and the coil. The seed layer between the coil turns is removed using a fluorine-containing plasma (e.g. $CF_4$) RIE process if the seed layer can be etched. If the seed layer is not etchable, a milling step is needed to remove electrical connection between the coil turns of the write coil. Because neither Cu or Ni—Fe form volatile fragments in this RIE process, their loss is minimal. A planarizing layer 722 of alumina is deposited over the entire structure followed by a planarization step, preferably by CMP, to planarize the structure at the desired thickness level 723 of P2 and the write coil. It should be noted that the planarization level 723 may not define both the top of the pole piece 408 and the write coil 412. It is possible to plate either the pole piece 408 or the write coil 412 to a level below the planarization level 723 and thus not expose the plated metal of the lower of the two during the planarization step. If the planarizing layer 722 of alumina does not entirely fill the spaces between the coil turns, an additional hard bake resist layer is deposited to fill the voids. A hard-baked resist layer 724 is formed over the coil area to fill any voids 726 in the planarizing alumina layer 722 and to form an insulation layer between the write coil and the subsequently formed pole (P3) structure magnetically connecting the P2 tip 408 and the BG 409. The P3 pole 728 is formed by plating Ni—Fe over the insulation layer 724 forming a magnetic connection between the P2 tip 408 and the BG 409. The P3 pole is recessed away from the ABS which is subsequently defined by a lapping process as is well known in the art. This completes the fabrication process of the write head according to this embodiment of the invention.

Figure 8:
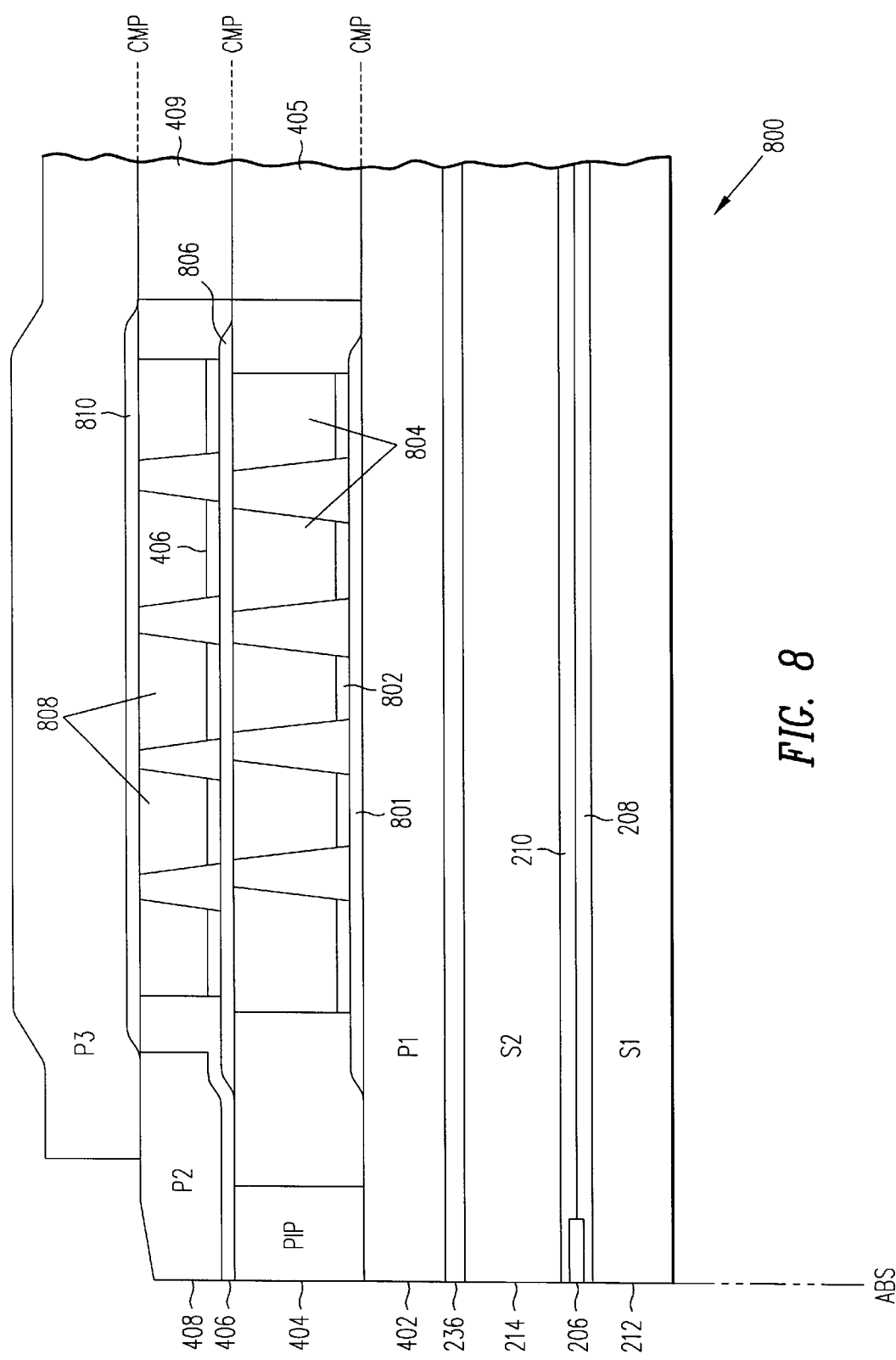
FIG. 8 is a vertical cross-section, not to scale, of another embodiment of a read/write head made by the method of the present invention.

FIG. 8 is a cross-sectional view, not to scale, of a second example of a read/write head 800 fabricated according to the method whereby a write head pole and a write coil are defined in a single thin resist lithographic step and image transfer process. The read/write head 800 comprises a write head having a dual layer write coil structure wherein a planar second coil 808 is located above a planar first coil 804 as is known in the art. The process of making the read/write head 800 according to the present invention comprises steps to define a first pole tip pedestal (P1P) 404 and a planar first write coil 804, coplanar with the P1P, in a first single thin resist lithographic step and image transfer process and a second pole tip (P2) 408 and a planar second coil 808, coplanar with the P2, in a second single thin resist lithographic step and image transfer process. In the embodiment shown in FIG. 8, the seed layer for the second coil is also used as the write gap 406.

Figure 9A:
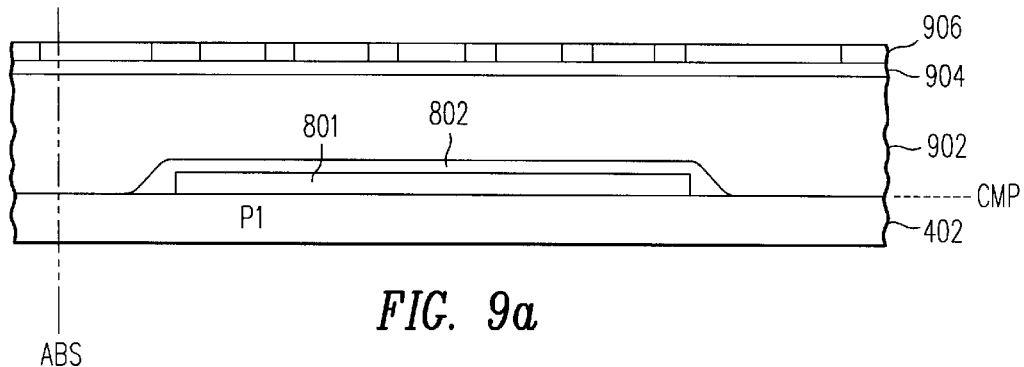
FIGS. 9a–9i are vertical cross-sections, not to scale, of the read/write head of FIG. 8 illustrating sequential steps of making the head by the method of the present invention.
Figure 9B:
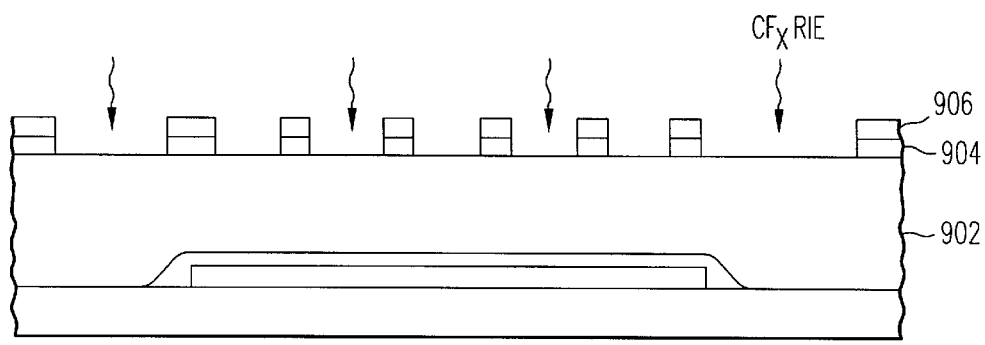
Figure 9C:
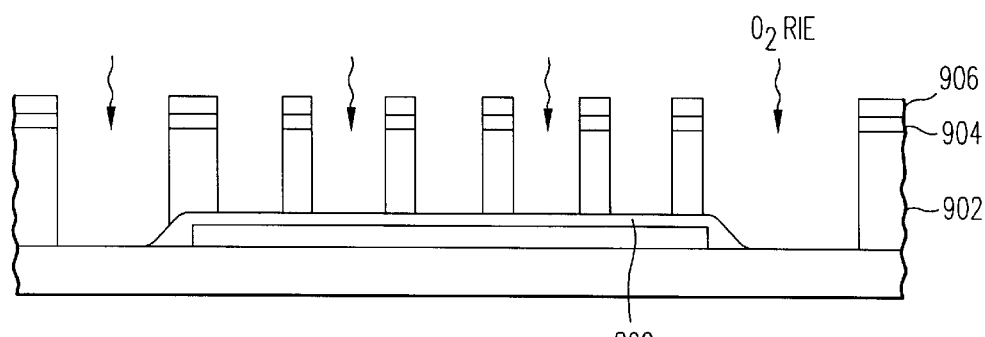
Figure 9D:
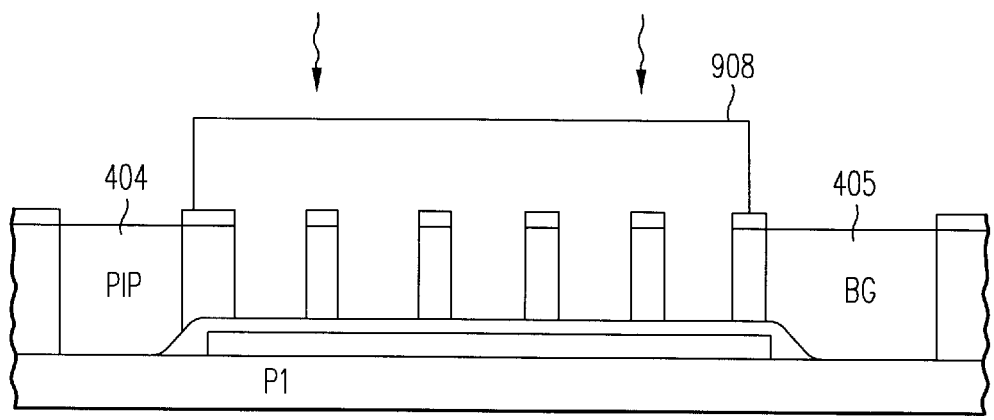
Figure 9E:
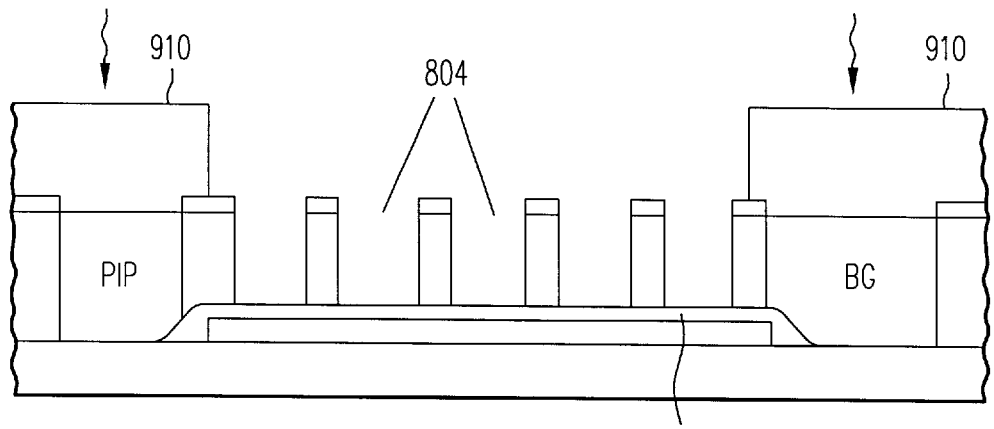
Figure 9F:
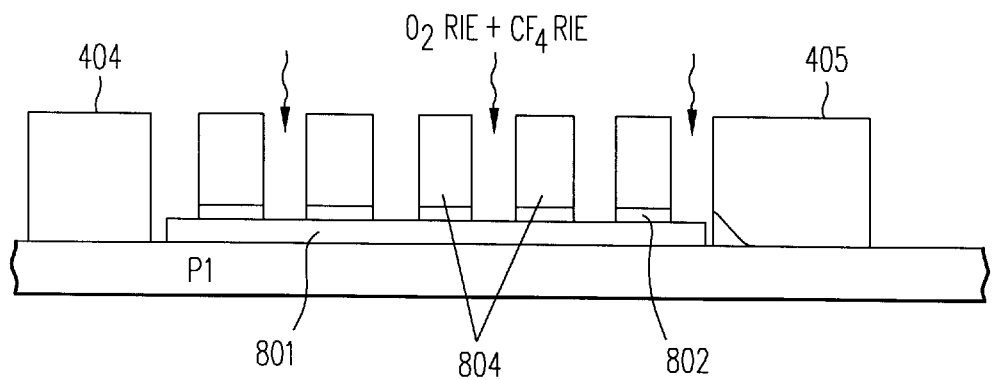
Figure 9G:
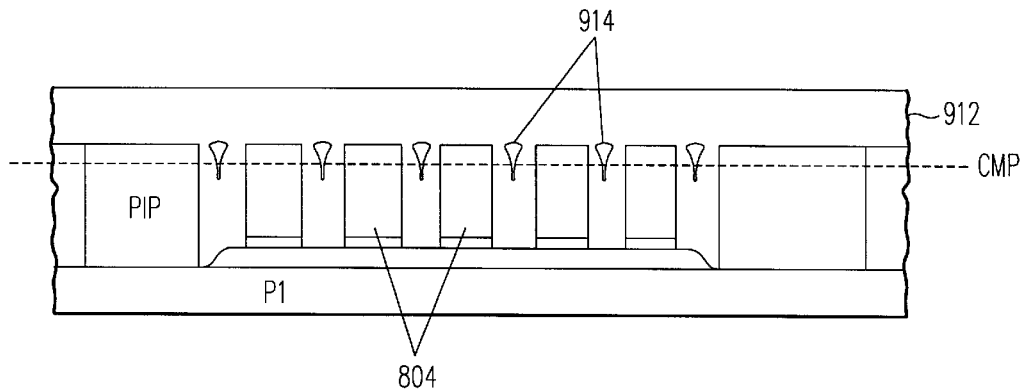
Figure 9H:
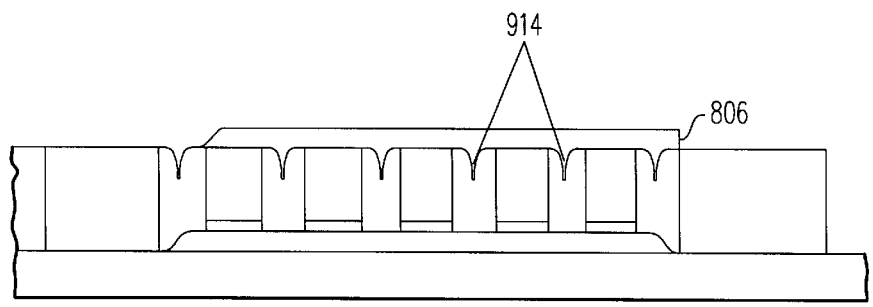
Figure 9I:
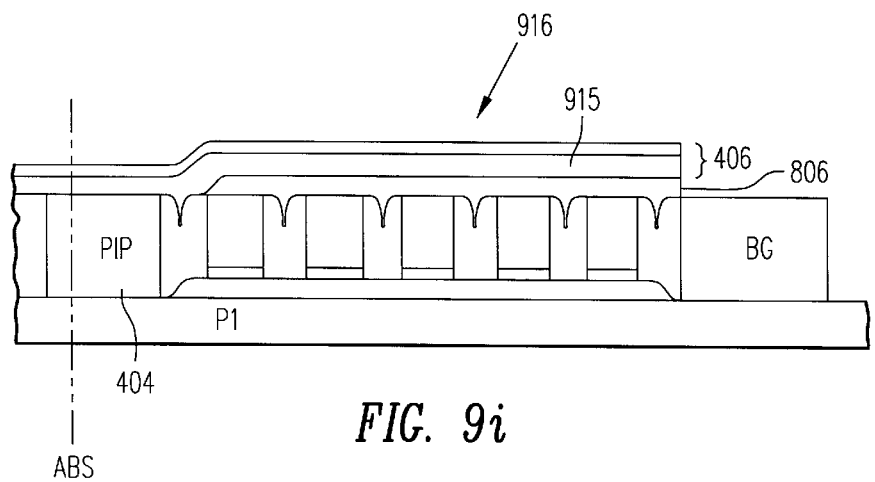

Fabrication of the write head of the read/write head 800 comprises the following steps as shown in FIGS. 9a–9i with reference to FIG. 8. In FIG. 9a, after P1 402 is plated, a first planarization step, preferably a CMP process, is used to planarize the structure. An insulation layer 801 is patterned and deposited on P1 402 in the region where the first write coil 804 is to be formed. A seed layer 802 which may be made of readily RIE-able nonmagnetic material, preferably tungsten (W) or molybdenum (Mo), is formed over insulation layer 801. The seed layer is electrically connected to plating contact pads on the wafer substrate. The seed layer is electrically isolated from the pole pieces by the insulation layer 801 deposited on P1. A thick hard-baked photoresist layer 902 having a thickness greater than the desired thickness of the first pole tip pedestal (P1P) 404 or the first write coil layer 804 is formed over P1 and the seed layer and a hard reactive-ion etch (RIE) mask layer 904 of RIE-able material such as $TaO_x$, or alternatively Ta, Si or $SiO_2$, having a thickness in the range of 0.2–0.4 $\mu$m is deposited on the hard baked photoresist layer 902. A thin image resist layer 906 having a thickness in the range of 0.3–0.6 $\mu$m is formed on the hard RIE mask 904. Both P1P 404 and the first write coil structure 804 (for simplicity, only a small number (5) of coil turns are shown in the drawings) as well as the BG structure 405 is defined in the thin image resist layer 906 in a single high resolution lithography step over the hard RIE mask 904. Because the lithography is in a layer only 0.3–0.6 $\mu$m thick, the resolution limits of optical lithography can be extended to accommodate the advanced head structure. In FIG. 9b, the image of the thin image resist 906 is transferred via a fluorine containing plasma RIE process into the underlying hard RIE mask 904 of $TaO_x$. In FIG. 9c, using an oxygen-containing (e.g., $Co_2$, $O_3^+$, $O_2$) plasma through the openings in the $TaO_x$ mask 904, RIE of the hard-baked photoresist 902 is done to form openings for deposition of P1P, the BG and the first write coil. The seed layer 802 under the first write coil area is exposed by the oxygen-containing RIE step. In FIG. 9d, the first write coil area is protected by a resist 908 which is flood exposed and P1P 404 and the BG 405 are formed by depositing, preferably by plating, Ni—Fe on the opened portions of P1. In FIG. 9e, the coil protection resist 908 is removed by development, P1P and the BG are protected by resist 910 which is flood exposed and the first write coil 804 is formed by depositing, preferably by plating, a metal such as copper (Cu). In FIG. 9f, the pole protection resist 910 is removed by development followed by removal by oxygen-containing RIE of the remaining hard-baked resist 902 that defined P1P, the BG and the first write coil. Alternatively, the write coil 804 may be formed first followed by formation of P1P 404 and BG 405 by modifying the order of steps illustrated in FIGS. 9d, 9e and 9f. The seed layer 802 between the coil turns is removed using a fluorine-containing plasma RIE process. For seed layer materials not removable by RIE, an ion milling step may be used to electrically isolate the coil turns from one another and from the pole piece. In either case, a non-RIEable insulator, such as alumina, is the preferred material forming the insulation layer 801 deposited on P1 402 to electrically isolate the write coil 804 from P1. The insulation layer 801 acts either as a RIE etch stop or as a mill resistant layer. Care must be taken to not over mill the seed layer 802 so as to etch into P1 402, as a redeposition of metal may result in an unwanted electrical connection of the write coil 804 with a pole piece. Because neither Cu or Ni—Fe form volatile fragments in this RIE process, their loss is minimal. In FIG. 9g, a planarizing layer 912 of alumina or, alternatively, resist is deposited over the entire structure followed by a second planarization step, preferably a CMP process, to planarize the structure at the desired thickness level of P1P and the first write coil. In FIG. 9h, an insulation layer such as a hard-baked resist layer 806 is formed over the first write coil area to fill any voids 914 in the planarizing alumina layer 912 and to form an insulation layer between the first write coil and the subsequently formed second write coil 808. Alternatively, the insulation layer 806 may be formed of an oxide such as alumina. In FIG. 9i, a write gap layer 406 is deposited over the P1P 404 and the insulation layer 806. The write gap layer is chosen to have the combined function of write gap and seed layer for the second write coil. The write gap 406 may comprise a first sublayer 915 formed of tantalum (Ta) having a thickness of roughly 100 Å to promote adhesion and a second sublayer 916 formed of a nonmagnetic material such as ruthenium (Ru), rhodium (Rh), Nickel phosphide (NiP), or platinum (Pt) having a thickness in the range of 400–1600 Å deposited over the first sublayer. Alternatively, the write gap 406 may be formed of a single layer of nonmagnetic readily RIE-able material such as tungsten (W) or molybdenum (Mb).

Formation of the second pole tip (P2) 408 and the second write coil layer 808 is carried out by repeating the procedure described above with reference to FIGS. 7e–7l for formation of P2 and the write coil layer, coplanar with P2, for the read/write head 400 of FIG. 4 and in the interest of brevity will not be repeated.

Figure 10:
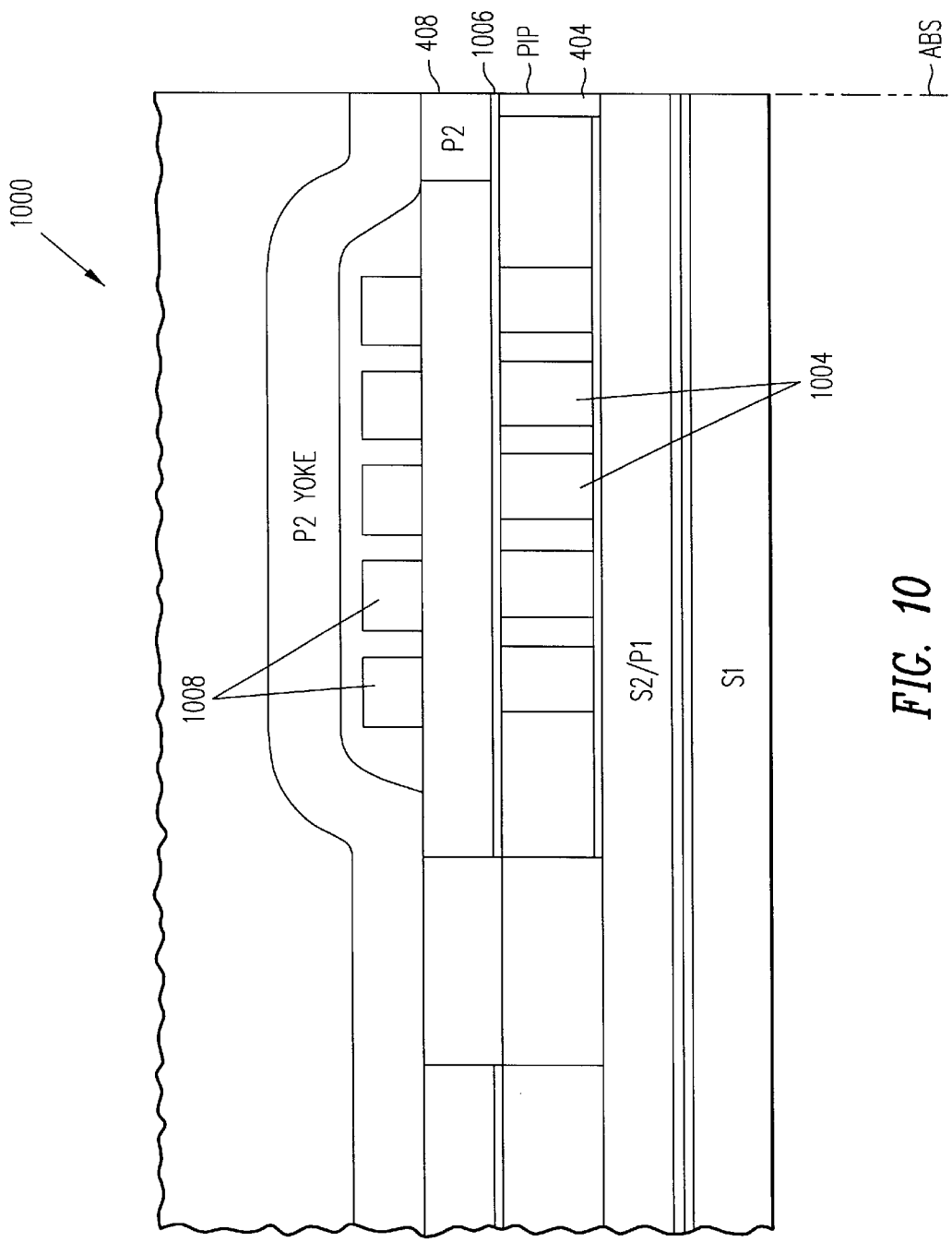
FIG. 10 is a vertical cross-section, not to scale, of another embodiment of a read/write head made by the method of the present invention.

FIG. 10 is a cross-sectional view, not to scale, of a third example of a read/write head 1000 fabricated according to the method of the present invention whereby a write head pole and a write coil are defined in a single thin resist lithographic step and image transfer process. The read/write head 1000 comprises a write head having a dual layer write coil structure wherein a planar second coil 1008 is located above a planar first coil 1004 as is known in the art. The process of making the read/write head 1000 according to the present invention comprises steps to define the first pole tip pedestal (P1P) 404 and the planar first write coil 1004, coplanar with the P1P, in a single thin resist lithographic step and image transfer process. The first pole tip pedestal (P1P) 404 and the planar first write coil 1004 may be fabricated by the method described above with reference to FIGS. 9a–9i. The second pole tip (P2) 408 and the planar second coil 1008 are not fabricated to be coplanar and may be fabricated over the write gap 1006 by methods known to the art.

The method of simultaneous definition and direct transfer of a write head pole and a write coil of the present invention provides a number of advantages over the prior art. First, the use of a single high resolution lithography step to define both a write pole and a write coil that is coplanar with the write pole avoids the problems of reflective notching associated with lithography to define the pole tip in the vicinity of non-planar features of the coil structure. Second, the use of a thin image resist layer over a hard reactive-ion etch mask and image transfer techniques allows very high resolution optical lithography which can accommodate formation of a very compact coil and pole structure. Separation of the back edge of the pole tip and the outermost turn of the coil is less than the final pole tip height while maintaining an essentially vertical sidewall. The capability to fabricate narrow pitch write coils and the compact coil/pole structure allows fabrication of read/write heads having yoke lengths less than 10 μm. The single lithography process also eliminates alignment inaccuracies inherent in separate lithography processes for the coil and pole. Third, the use of a material that allows the write gap to also serve as a seed layer for the pole and coil reduces the seed layer fabrication to one layer. By using tungsten or molybdenum for the write gap/seed layer, the problems associated with ion mill removal of the seed layer from between narrow, high aspect ratio coils are alleviated because the vapor partial pressure of $WF_6$ (or $MoF_6$) created during RIE in a fluorine containing plasma like $CF_4$ is relatively high.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only in scope as specified in the appended claims.

We claim:

1. A method of making a magnetic read/write head that includes first and second pole tip layers, each of said first and second pole tip layers having a yoke portion located between a pole tip portion and a back gap portion, a nonmagnetic write gap layer located between the pole tip portions of first and second pole piece layers, and an insulation stack with at least one write coil layer embedded therein located between the yoke portions of the first and second pole piece layers, the method comprising the steps of:

patterning and depositing an insulation layer over the yoke portion of the first pole piece layer;

depositing a seed layer of nonmagnetic material over the first insulation layer;

depositing a hard-baked photoresist layer having a thickness greater than the desired thickness of the coil layer over the seed layer;

depositing a hard reactive-ion (RIE) mask on the hard-baked photoresist layer;

depositing a thin image resist layer on the hard RIE mask;

defining an image of a pole tip layer and a write coil layer in the thin image resist layer in a single high resolution photolithography step;

transferring the image of the pole tip layer and write coil layer into the hard RIE mask layer via a RIE process that creates openings in the hard RIE mask;

reactive ion etching the hard-baked photoresist layer through the openings in the hard RIE mask layer to expose the seed layer in a pole tip layer region and a write coil layer region;

depositing the pole tip layer on the seed layer in the pole tip layer region while protecting the write coil layer region with resist;

removing the resist protecting the write coil region;

depositing the write coil layer on the seed layer in the write coil layer region while protecting the pole tip layer with resist;

removing the resist protecting the pole tip layer;

removing by RIE processes the hard-baked photoresist layer between coil turns of the write coil layer;

removing the seed layer between coil turns of the write coil layer; and depositing an insulation layer between the coil turns and over the write coil layer.

2. The method as recited in claim 1, wherein the seed layer removal is by a reactive ion etch (RIE) process.

3. The method as recited in claim 1, wherein the seed layer removal is by an ion milling process.

4. The method as recited in claim 1 wherein the seed layer forms the nonmagnetic write gap layer.

5. The method as recited in claim 1 wherein the seed layer is chosen from a group of materials consisting of tungsten (W) and molybdenum (Mb).

6. The method as recited in claim 1 wherein the seed layer comprises a first sublayer deposited over the first pole piece layer and a second sublayer deposited over the first sublayer.

7. The method as recited in claim 6 wherein the first sublayer is made of tantalum (Ta).

8. The method as recited in claim 6 wherein the second sublayer is chosen from a group of materials consisting of nickel phosphide (NiP), ruthenium (Ru), rhodium (Rh) and platinum (Pt).

9. The method as recited in claim 1 wherein the pole tip layer is chosen from a group of materials consisting of Ni—Fe and Co—Fe.

10. The method as recited in claim 1 wherein the coil layer is made of copper (Cu).

11. The method as recited in claim 1 further including the step of planarization of the deposited pole tip layer, coil layer and insulation layer between the coils to planarize the structure at the desired thickness level of the pole tip layer and write coil layer.

12. The method as recited in claim 11 wherein the step of planarization is by a chemical mechanical polishing process.

13. A method of making a magnetic read/write head that includes first and second pole tip layers, each of said first and second pole tip layers having a yoke portion located between a pole tip portion and a back gap portion, a nonmagnetic write gap layer located between the pole tip portions of first and second pole piece layers, and an insulation stack with at least one write coil layer embedded therein located between the yoke portions of the first and second pole piece layers, the method comprising the steps of:

patterning and depositing an insulation layer over the yoke portion of the first pole piece layer;

depositing a second layer of nonmagnetic material over the first insulation layer;

depositing a hard-baked photoresist layer having a thickness greater than the desired thickness of the coil layer over the seed layer;

depositing a hard reactive-ion (RIE) mask on the hard-baked photoresist layer;

depositing a thin image resist layer on the hard RIE mask;

defining an image of a pole tip layer and a write coil layer in the thin image resist layer in a single high resolution photolithography step;

transferring the image of the pole tip layer and write coil layer into the hard RIE mask layer via an RIE process that creates openings in the hard RIE mask;

reactive ion etching the hard-baked photoresist layer through the openings in the hard RIE mask layer to expose the seed layer in a pole tip layer region and a write coil layer region;

depositing the write coil layer on the seed layer in the write coil layer region while protecting the pole tip layer region with resist;

removing the resist protecting the pole tip layer region;

depositing the pole tip layer on the seed layer in the pole tip layer region while protecting the write coil layer with resist;

removing the resist protecting the write coil layer;

removing by RIE processes the hard-baked photoresist layer between coil turns of the write coil layer;

removing the seed layer between coil turns of the write coil layer; and depositing an insulation layer between the coil turns and over the write coil layer.

14. The method as recited in claim 13 further including the step of planarization of the deposited pole tip layer, coil layer and insulation layer between the coils to planarize the structure at the desired thickness level of the pole tip layer and write coil layer.

15. The method as recited in claim 14 wherein the step of planarization is by a chemical mechanical polishing process.

16. A method of making a magnetic read/write head that includes first and second pole tip layers, each of said first and second pole tip layers having a yoke portion located between a pole tip portion and a back gap portion, a nonmagnetic write gap layer located between the pole tip portions of first and second pole piece layers, and an insulation stack with at least one write coil layer embedded therein located between the yoke portions of the first and second pole piece layers, the method comprising the steps of:

patterning and depositing an insulation layer over the yoke portion of the first pole piece layer;

depositing a seed layer of nonmnagnetic material over the first insulation layer;

depositing a hard-baked photoresist layer having a thickness greater than the desired thickness of the coil layer over the seed layer;

depositing a hard reactive-ion (RIE) mask on the hard-baked photoresist layer;

depositing a thin image resist layer on the hard RIE mask;

defining an image of a pole tip layer and a write coil layer in the thin image resist layer in a single high resolution photolithography step;

transferring the image of the pole tip layer and write coil layer into the hard RIE mask layer via an RIE process that creates openings in the hard RIE mask;

reactive ion etching the hard-baked photoresist layer through the openings in the hard RIE mask layer to expose the seed layer in a pole tip layer region and a write coil layer region;

depositing the pole tip layer on the seed layer in the pole tip layer region while protecting the write coil layer region with resist;

removing the resist protecting the write coil region;

depositing the write coil layer on the seed layer in the write coil layer region;

removing by RIE processes the hard-baked photoresist layer between coil turns of the write coil layer;

removing the seed layer between coil turns of the write coil layer; and depositing an insulation layer between the coil turns and over the write coil layer.

17. The method as recited in claim 16 further including the step of planarization of the deposited pole tip layer, coil layer and insulation layer between the coils to planarize the structure at the desired thickness level of the pole tip layer and write coil layer.

18. The method as recited in claim 17 wherein the step of planarization is by a chemical mechanical polishing process.

19. A method of making a magnetic read/write head that includes first and second pole tip layers, each of said first and second pole tip layers having a yoke portion located between a pole tip portion and a back gap portion, a nonmagnetic write gap layer located between the pole tip portions of first and second pole piece layers, and an insulation stack with at least one write coil layer embedded therein located between the yoke portions of the first and second pole piece layers, the method comprising the steps of:

patterning and depositing an insulation layer over the yoke portion of the first pole piece layer;

depositing a seed layer of nonmagnetic material over the first insulation layer;

depositing a hard-baked photoresist layer having a thickness greater than the desired thickness of the coil layer over the seed layer;

depositing a hard reactive-ion (RIE) mask on the hard-baked photoresist layer;

depositing a thin image resist layer on the hard RIE mask;

defining an image of a pole tip layer and a write coil layer in the thin image resist layer in a single high resolution photolithography step;

transferring the image of the pole tip layer and write coil layer into the hard RIE mask layer via an RIE process that creates openings in the hard RIE mask;

reactive ion etching the hard-baked photoresist layer through the openings in the hard RIE mask layer to expose the seed layer in a pole tip layer region and a write coil layer region;

depositing the write coil layer on the seed layer in the write coil layer region while protecting the pole tip layer region with resist;

removing the resist protecting the pole tip layer region;

depositing the pole tip layer on the seed layer in the pole tip layer region;

removing by RIE processes the hard-baked photoresist layer between coil turns of the write coil layer;

removing the seed layer between coil turns of the write coil layer, and depositing an insulation layer between the coil turns and over the write coil layer.

20. The method as recited in claim 19 further including the step of planarization of the deposited pole tip layer, coil layer and insulation layer between the coils to planarize the structure at the desired thickness level of the pole tip layer and write coil layer.

21. The method as recited in claim 20 wherein the step of planarization is by a chemical mechanical polishing process.

22. A method of making a magnetic read/write head that includes first and second pole tip layers, each of said first and second pole tip layers having a yoke portion located between a pole tip portion and a back gap portion, a nonmagnetic write gap layer located between the pole tip portions of first and second pole piece layers, and an insulation stack with a first write coil layer and a second write coil layer embedded therein located between the yoke portions of the first and second pole piece layers, the method comprising the steps of:

defining a first pole tip layer and a first write coil layer in a first single thin resist lithographic step and image transfer process;

depositing the first pole tip layer and the first write coil layer in separate processes, said first pole tip layer being coplanar with said first write coil layer;

defining a second pole tip layer and a second write coil layer in a second single thin resist lithographic step and image transfer process; and depositing the second pole tip layer and the second write coil layer in separate, processes, said second pole tip layer being coplanar with said second write coil layer.

23. A method of making a magnetic read/write head comprising the steps of:

defining a pole tip layer in a pole tip layer region and a write coil layer in a write coil layer region, the write coil layer being defined coplanar with said pole tip layer in a single thin resist lithographic step and image transfer process;

protecting only one of the pole tip layer region and the write coil layer region with a resist; and forming the pole tip layer and the write coil layer in separate deposition processes, wherein the layer associated with the unprotected region is formed first.

* * * * *

UNITED STATES PATENT AND TRADEMARK OFFICE
CERTIFICATE OF CORRECTION

PATENT NO. : 6,696,226 B1
DATED : February 24, 2004
INVENTOR(S) : Dinan et al.

It is certified that error appears in the above-identified patent and that said Letters Patent is hereby corrected as shown below:

Column 2,
Line 15, change "ethod" to -- method --.

Column 12,
Line 1, change "second layer" to -- seed layer --;
Line 53, change "nonmnagnetic" to -- nonmagnetic --.

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,696,226 B1
APPLICATION NO. : 10/290747
DATED : February 24, 2004
INVENTOR(S) : Dinan et al.

It is certified that error appears in the above-identified patent and that said Letters Patent is hereby corrected as shown below:

column 6, line 17 "with the the" should read --with the--;

Signed and Sealed this

Fourteenth Day of July, 2009

JOHN DOLL
*Acting Director of the United States Patent and Trademark Office*